Feb. 20, 1951 E. C. HORTON 2,542,198
FILTER FOR AIR MOTORS
Filed July 9, 1947
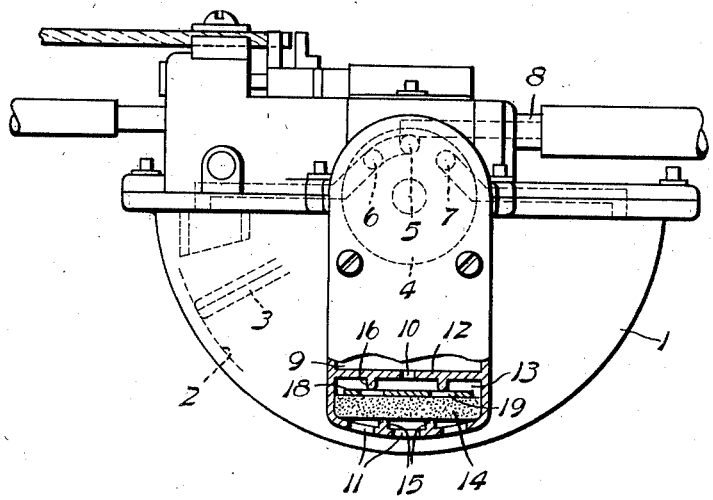
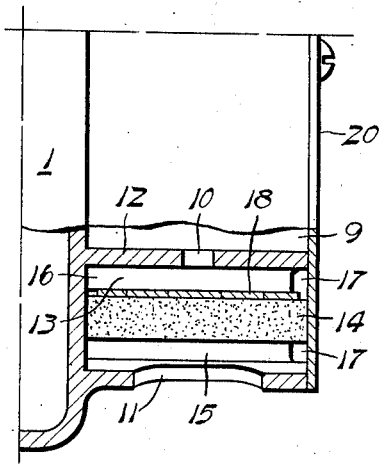
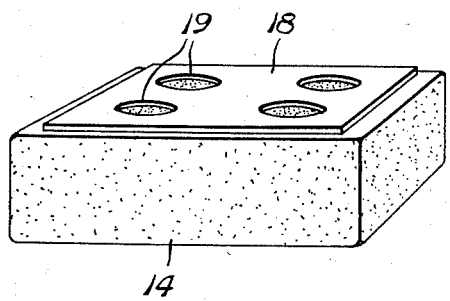
INVENTOR
*Erwin C. Horton*
BY
*Bean, Brooks, Buckley & Bean*
ATTORNEYS Patented Feb. 20, 1951

2,542,198

UNITED STATES PATENT OFFICE 2,542,198

FILTER FOR AIR MOTORS

Erwin C. Horton, Hamburg, N. Y., assignor to Trico Products Corporation, Buffalo, N. Y.

Application July 9, 1947, Serial No. 759,835

2 Claims. (Cl. 183—44)

This invention relates to the fluid motor art and has primary reference to suction operated motors such as are used for driving the wiper of a windshield cleaner arrangement, the same being an improvement on an earlier Patent No. 2,260,853.

In such earlier patent there is disclosed an air filter for removing foreign particles from the atmospheric air as it enters through the automatic valve mechanism of the motor, the filter being superimposed upon a partition wall in which latter is provided one or more apertures over which the filter rests. Where the filter rests directly on the partition, it has been found that the capacity of the filter is practically limited to the size of the opening or openings through the partition and consequently any foreign matter collecting on the filter about the opening will tend to restrict the passage of air into the cleaner.

The object of the present invention is to provide a windshield cleaner motor with filter means by which an ample volume of atmospheric air is passed for the efficient operation of the motor.

A further object of the invention is to provide a suction operated motor of this character in which the filter is economically produced and readily assembled in the motor structure.

The foregoing and other objects will manifest themselves as the description progresses, reference being had to the accompanying drawing, wherein Fig. 1 is a view in elevation of a windshield cleaner motor, a portion of the filter chamber being broken away to more clearly show the internal arrangement;

Fig. 2 is an enlarged fragmentary view further showing the filter arrangement; and Fig. 3 is a detailed perspective view of the filter assembly.

Referring more particularly to the drawing, the numeral 1 designates the suction operated motor such as might be employed for wiping the windshields of motor vehicles, the motor having a chamber 2 in which oscillates a piston-like vane 3 under the urge of a fluid pressure differential between the outside atmospheric pressure and the suction influence as provided by the intake manifold of a motor vehicle engine or other suitable source of supply. The pressure differential is reversed by an automatic valve mechanism generally indicated at 4 which serves to alternately connect the suction supply port 5 first to one and then to the other of two chamber ports 6 and 7. The suction supply port 5 communicates through a passage 8 with the source of suction. The automatic valve mechanism uncovers one chamber port while connecting the other chamber port to the suction supply port, and such uncovered chamber port opens through the valve compartment 9 to the outside atmosphere through openings 10 and 11. The aperture 10, of which there may be several, is formed in a partition wall 12 that separates the valve compartment from a filter chamber 13, while the openings 11 are formed in the outer wall of the filter chamber. The partition wall therefore defines a filter chamber separate and distinct from the valve compartment.

A filter element 14, preferably in the form of a felt pad, is fitted within the filter chamber so as to compel the passage of air therethrough from the openings 11 to the apertures 10. This filter pad is supported by and between ribs 15 and 16, the ribs 15 being formed on the perforated outer wall of the filter chamber, while the ribs 16 are formed on the partition wall 12. The ribs of the two walls may be relatively offset, as shown in Fig. 1, and they may be shortened, as shown at 17 in Fig. 2, to provide for the free circulation of air through the filter chamber. These ribs serve to support the felt-like filter pad out of direct contact with the two chamber walls and thereby enlarge the filter area through which the outside air may enter. Therefore, any foreign particles collected by the filter will be scattered and thus avoid any concentrated and clogging deposit about the aperture 10.

If desired, the soft flexible filter of hairy texture may be given substantial support by a relatively stiff plate 18 which will serve to support the pad against being drawn against the partition wall between the ribs 16. The supporting plate 18 will be provided with a suitable number of apertures 19 to permit the free flow of air through the filter without clogging action. This reinforcing plate will be held in position on the ribs 16 by the resiliency of the filter pad material and may be of such dimension as to provide a marginal exposure of the filter pad thereabout for increasing the air flow capacity. The filter and its supporting plate may readily be positioned within the filter chamber by removing the cover plate 20 which extends over both the valve compartment 9 and the filter chamber 13.

The invention is simple and efficient in use, and while the foregoing description has been given in detail it is not intended by way of limitation since the inventive principles involved are capable of assuming other physical embodiments without departing from the spirit of the invention and the scope of the appended claims.

What is claimed is:

1. A filter chamber for fluid motors, having opposed walls with openings therein for fluid flow, a flexible filter member inserted in the chamber, one wall having spaced ribs supporting the filter member spaced therefrom, and a reinforcing plate interposed between the filter member and the ribs to give support to the filter member and having openings extending across the ribs for fluid passage from one side to the other of each rib.

2. A filter chamber for fluid motors, having opposed walls with openings therein for fluid flow, a flexible filter member inserted in the chamber, one wall having spaced ribs supporting the filter member spaced therefrom, and a reinforcing member interposed between the filter member and the ribs to give support to the filter member, said reinforcing member being in the form of a relatively rigid plate formed with apertures and being of smaller dimension than the filter member to marginally expose the latter thereabout for the passage of air therethrough.

ERWIN C. HORTON.

REFERENCES CITED

The following references are of record in the file of this patent:

UNITED STATES PATENTS

| Number | Name | Date |
| --- | --- | --- |
| 2,260,853 | Hueber | Oct. 28, 1941 |
| 2,338,690 | Timm | Jan. 4, 1944 |
| 2,400,719 | Stackhouse | May 21, 1946 |